United States Patent
Chu

(10) Patent No.: US 8,837,217 B2
(45) Date of Patent: Sep. 16, 2014

(54) MEMORY STORAGE APPARATUS, AND MEMORY CONTROLLER AND POWER CONTROL METHOD

(75) Inventor: Chien-Hua Chu, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 293 days.

(21) Appl. No.: 13/548,169

(22) Filed: Jul. 12, 2012

(65) Prior Publication Data

US 2013/0275654 A1 Oct. 17, 2013

(30) Foreign Application Priority Data

Apr. 17, 2012 (TW) .................................. 101113624

(51) Int. Cl.
*G11C 11/34* (2006.01)
(52) U.S. Cl.
USPC ............ 365/185.08; 365/185.17; 365/185.18; 711/154
(58) Field of Classification Search
CPC ........ G11C 11/00; G11C 16/10; G11C 16/06; G11C 16/04; G11C 7/00; G11C 11/402; G11C 11/56; G11C 7/04; H01L 27/11582
USPC ............ 365/185.08, 185.17, 185.18, 185.27, 365/185.28, 185.23, 185.33; 711/154, 105, 711/E12.008, E12.016
See application file for complete search history.

(56) References Cited

U.S. PATENT DOCUMENTS

| 7,428,662 B2 * | 9/2008 | Benedix et al. ................. 714/30 |
| 2009/0168534 A1 * | 7/2009 | Park et al. ................ 365/185.17 |
| 2010/0257304 A1 * | 10/2010 | Rajan et al. ...................... 711/6 |

* cited by examiner

*Primary Examiner* — Hien Nguyen
(74) *Attorney, Agent, or Firm* — Jianq Chyun IP Office

(57) ABSTRACT

A memory storage apparatus having a rewritable non-volatile memory module, a first circuit, a memory controller and a power management circuit is provided. The first circuit outputs a state signal and keeps the state signal in a first state when the first circuit is enabled, and then the first circuit keeps the state signal in a second state after a predetermined condition is satisfied. When the memory controller receives a first signal, the power management circuit stops supplying an output voltage to the rewritable non-volatile memory module and the memory controller. Additionally, when the memory controller is enabled, the memory controller determines whether the state signal is in the first state. If true, the memory controller performs a first procedure; and if not, the memory controller performs a second procedure.

22 Claims, 12 Drawing Sheets

MEMORY STORAGE APPARATUS, AND MEMORY CONTROLLER AND POWER CONTROL METHOD

CROSS-REFERENCE TO RELATED APPLICATION

This application claims the priority benefit of Taiwan application serial no. 101113624, filed on Apr. 17, 2012. The entirety of the above-mentioned patent application is hereby incorporated by reference herein and made a part of this specification.

BACKGROUND

1. Field of the Present Invention

The present invention is directed to a rewritable non-volatile memory storage apparatus, and a memory controller and a power control method thereof.

2. Description of Related Art

Since a rewritable non-volatile memory has characteristics, such as data non-volatility, power saving, small volume, non-mechanical structure, and fast reading and writing speed, the rewritable non-volatile memory becomes a very popular part in the electronic industry in recent years For example, solid state drive (SSD) utilizing the rewritable non-volatile memory as the storage media has been widely applied in the computer host as a main hard disk for enhancing the access efficiency of the computer. When a user performs a sleep mode, the host system stops supplying power to a memory storage apparatus and a buffer memory in the same way as being powered off. In addition, when the user desires to return to a normal operation from the sleep mode, the memory storage apparatus can not identify whether to execute a normal activation procedure or a sleep-wakeup procedure. Therefore, it is necessary for a mechanism capable of quickly waking up the memory storage apparatus from the sleep mode as well as recognizing a state which the memory storage apparatus is in.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is related to a memory storage apparatus, a memory controller and power control method, which is capable of effectively reducing power consumption when entering a sleep mode and quickly returning to an operation mode when being waken up from the sleep mode.

According to an embodiment of the present invention, a memory storage apparatus is provided, which includes a rewritable non-volatile memory module, a first circuit, a memory controller and a power management circuit. The rewritable non-volatile memory module includes a plurality of physical blocks. The first circuit outputs a state signal. When the first circuit is enabled, the first circuit keeps the state signal in a first state, and after a predetermined condition is satisfied, the first circuit transfers the state signal from the first state to a second state and then keeps the state signal in the second state. The memory controller is coupled to the first circuit and the rewritable non-volatile memory module and configured to receive the state signal from the first circuit. The power management circuit is coupled to the first circuit and the memory controller and configured to receive an input voltage and to supply an output voltage to the memory controller and the rewritable non-volatile memory module after the memory storage apparatus is powered on. In an exemplary embodiment, when the memory controller receives a first signal from a host system, the memory controller outputs a second signal, and when the memory controller outputs the second signal, the power management circuit stops supplying the output voltage. In addition, when the memory controller is enabled, the memory controller determines whether the state signal is in the first state. If the state signal is in the first state, the memory controller performs a first procedure, and if the state signal is not in the first state, the memory controller performs a second procedure.

According to another exemplary embodiment of the present invention, a memory controller is provided, which is disposed in a memory storage apparatus. The memory storage apparatus has a first circuit, a power management circuit and a rewritable non-volatile memory module, and the rewritable non-volatile memory module has a plurality of physical blocks. The memory controller includes a host interface, a memory interface and a memory management circuit. The host interface is configured to be coupled to a host system. The memory interface is configured to be coupled to the rewritable non-volatile memory module. The memory management circuit is coupled to the host interface, the memory interface and the first circuit. When receiving a first signal from the host system, the memory controller outputs a second signal. When the memory controller outputs the second signal, the power management circuit stops supplying an output voltage to the memory controller and the rewritable non-volatile memory module. In addition, when the first circuit is enabled, the first circuit outputs a state signal and keeps the state signal in a first state, and after a predetermined condition is satisfied, the first circuit transfers the state signal from the first state to a second state and then keeps the state signal in the second state. Moreover, when the memory management circuit is enabled, the memory management circuit determines whether the state signal is in the first state. If true, the memory management circuit performs a first procedure, and if not, the memory management circuit performs a second procedure.

According to still another exemplary embodiment of the present invention, a power control method for a memory storage apparatus is provided. The memory storage apparatus has a memory controller, a first circuit, a power management circuit and a rewritable non-volatile memory module, and the rewritable non-volatile memory module has a plurality of physical blocks. The power control method includes when the first circuit is enabled, outputting a state signal and keeping the state signal in a first state by the first circuit, and after a predetermined condition is satisfied, transferring the state signal from the first state to a second state and then keeping the state signal in the second state by the first circuit. The power control method further includes when receiving a first signal from a host system, outputting a second signal by the memory controller, and when the memory controller outputs the second signal, stopping supplying an output voltage to the memory controller and the rewritable non-volatile memory module by the power management circuit. The power control method also includes when the memory storage apparatus is enabled, determining whether the state signal is in the first state by the memory controller. The power control method further includes, if the state signal is in the first state, performing a first procedure by the memory controller; and if the state signal is not in the first state, performing a second procedure by the memory controller.

In view of the foregoing, the memory storage apparatus, the memory controller and the power control method according to the exemplary embodiments of the present invention can save power more effectively by stopping supplying power to elements in the memory storage apparatus. Furthermore, the memory storage apparatus, the memory controller and the power control method according to the exemplary embodiments of the present invention can effectively recognize a sleep-wakeup procedure and a normal activation procedure according to the state signal of the first circuit and shorten the time required for returning from the sleep mode to the normal operation mode.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

In order to make the aforementioned features and advantages of the present invention more comprehensible, embodiments accompanying figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1A:
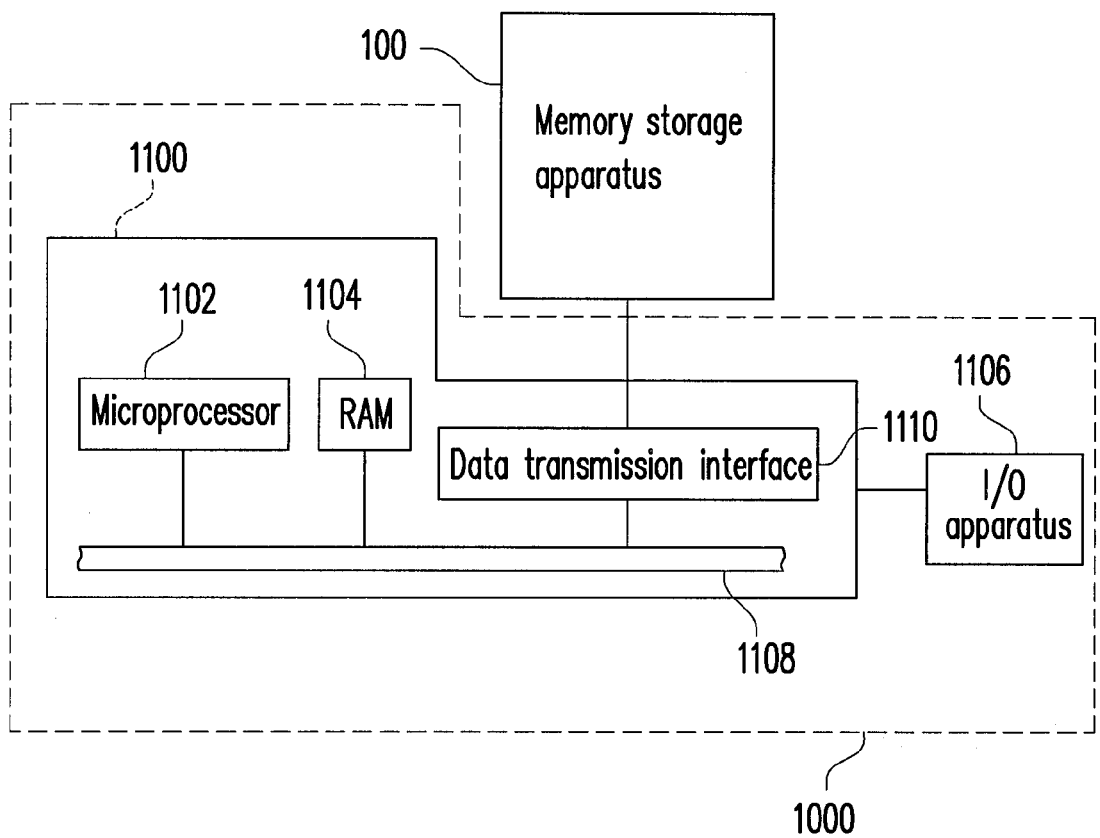
FIG. 1A illustrates a host system and a memory storage apparatus according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage apparatus (i.e., a memory storage system) typically includes a flash memory module and a controller (i.e., a control circuit). The memory storage apparatus is usually used together with a host system, such that the host system can write data into or read data from the memory storage apparatus.

FIG. 1A illustrates a host system and a memory storage apparatus according to an exemplary embodiment of the present invention.

Figure 1B:
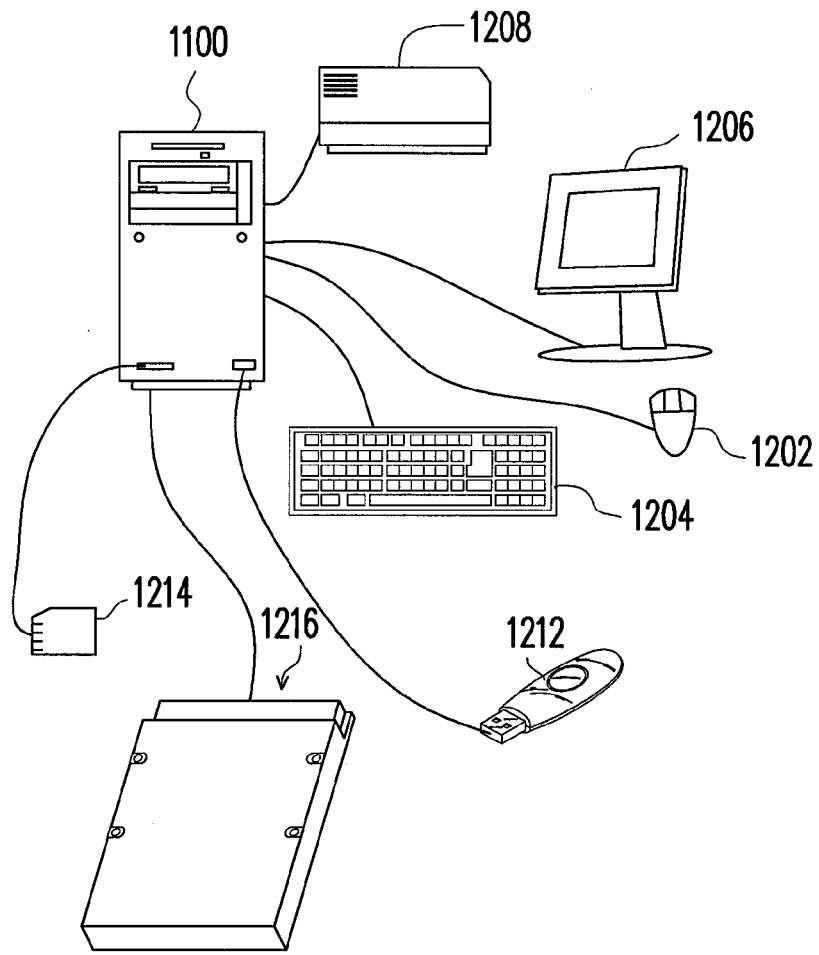
FIG. 1B is a schematic diagram illustrating a computer, an input/output (I/O) device, and a memory storage apparatus according to an exemplary embodiment of the present invention.

With reference to FIG. 1A, a host system 1000 typically includes a computer 1100 and an input/output (I/O) apparatus 1106. The computer 1100 includes a microprocessor 1102, a random access memory (RAM) 1104, a system bus 1108, and a data transmission interface 1110. The I/O apparatus 1106 includes a mouse 1202, a keyboard 1204, a display 1206, and a printer 1208, as shown in FIG. 1B. It should be understood that, the apparatus shown in FIG. 1B should not be construed as limitations to the present invention, and the I/O device 1106 may include other apparatuses as well.

In the embodiment of the present invention, the memory storage apparatus 100 is coupled to other elements of the host system 1000 via the data transmission interface 1110. By operating the microprocessor 1102, the RAM 1104 and the I/O device 1106, data can be written into or read from the memory storage apparatus 100. For instance, the memory storage apparatus 100 may be a rewritable non-volatile memory storage apparatus, such as a flash disk 1212, a memory card 1214, or a solid state drive (SSD) 1216, as shown in FIG. 1B.

Figure 1C:
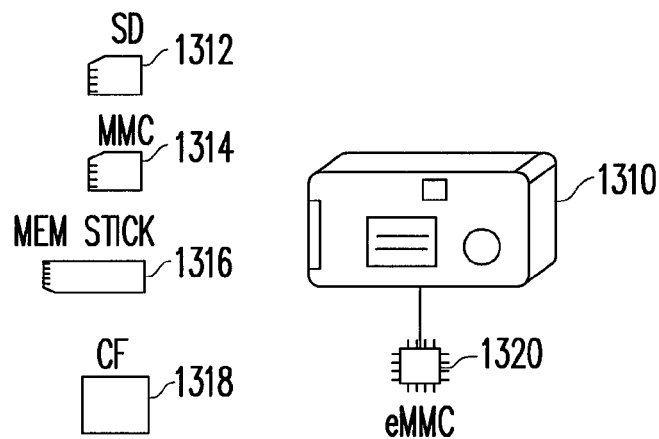
FIG. 1C is a schematic diagram illustrating a host system and a memory storage apparatus according to another exemplary embodiment of the present invention.

Generally, the host system 1000 may substantially be any system suitable for being used together with the memory storage apparatus 100 for storing data. Even though the host system 1000 is depicted as a computer system in the present exemplary embodiment, the host system 1000 in another exemplary embodiment may be a system such as a digital camera, a video camera, a communication apparatus, an audio player, a video player. For instance, if the host system is a digital camera (video camera) 1310, the rewritable non-volatile memory storage apparatus is an SD card 1312, an MMC 1314, a memory stick 1316, a CF card 1318, or an embedded storage apparatus 1320, which is used thereby (as shown in FIG. 1C). The embedded storage apparatus 1320 includes an embedded MMC (eMMC). It should be noted that the eMMC is directly coupled to a substrate of the host system.

Figure 2:
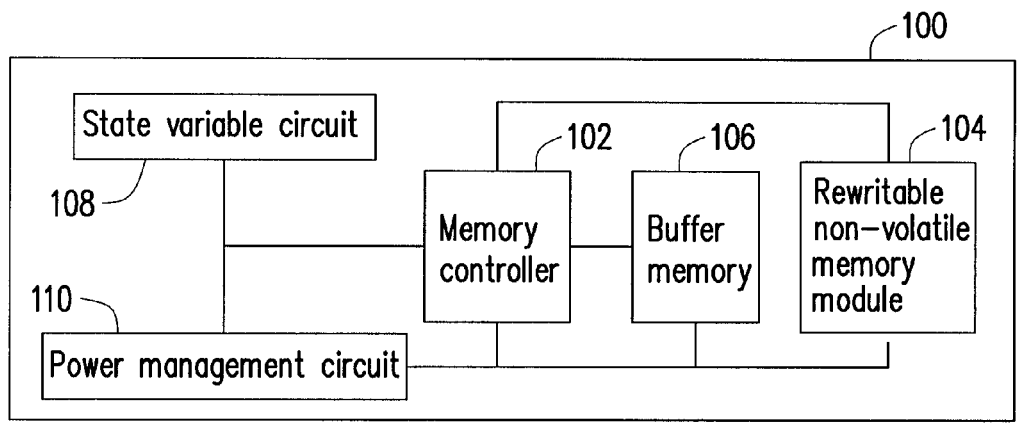
FIG. 2 is a schematic block diagram illustrating the memory storage apparatus depicted in FIG. 1A.

FIG. 2 is a schematic block diagram illustrating the memory storage apparatus depicted in FIG. 1A.

With reference to FIG. 2, the memory storage apparatus 100 includes a memory controller 102, a rewritable non-volatile memory module 104, a buffer memory 106 and a first circuit (hereinafter as a state variable circuit) 108 and a power management circuit 110.

The memory controller 102 is configured to execute a plurality of logic gates or control instructions implemented in a form of hardware or firmware and according to commands given by the host system 1000, and to perform various data operations in the rewritable non-volatile memory module 104, such as a of data write operation, a data reading data operation, a data erasing data operation, a data merge data operation, and so on.

The rewritable non-volatile memory module 104 is coupled to the memory controller 102 and has a plurality of physical blocks for storing data written by the host system 1000. In the present exemplary embodiment, each of the physical blocks has a plurality of physical pages, and the physical pages belonging to the same physical block can be written individually and erased simultaneously. For instance, each of the physical blocks is constituted by 128 physical pages, and a capacity of each of the physical pages is 4 kilobytes (KB). Nevertheless, it should be understood that the present invention is not limited thereto.

In more detail, a physical block is the smallest unit for erasing. Namely, each of the physical blocks includes the least number of memory cells for being erased altogether. A physical page is the smallest unit for programming. That is, a physical page is the smallest unit for updating data. However, it should be understood that in another exemplary embodiment of the present invention, the smallest unit for updating data may be a physical sector or other size. Each physical page usually includes a data bit area and a redundancy bit area. The data bit area is configured to store user data, and the redundancy bit area is configured to store information of system data (e.g., error checking and correcting (ECC) codes, mapped logical blocks).

In the present exemplary embodiment, the rewritable non-volatile memory module 104 is a multi level cell (MLC) NAND flash memory module. However, the present invention is not limited thereto. The rewritable non-volatile memory module 104 can also be a single level cell (SLC) NAND flash memory module, a trinary level cell (TLC) NAND flash memory module, other flash memory modules or other memory modules with the same property.

The buffer memory 106 is coupled to the memory controller 102 and configured to temporarily store data and commands from the host system 1000 or data from the rewritable non-volatile memory module 104. For instance, the buffer memory 106 may be a static random access memory (SRAM), a dynamic random access memory (DRAM), and so forth.

The state variable circuit 108 is coupled to the memory controller 102 and configured to output a state signal. Specifically, in the present embodiment of the present invention, when the memory storage apparatus 100 is powered on to enable the state variable circuit 108, the state variable circuit 108 outputs the state signal, and after the memory storage apparatus 100 is powered on for a predetermined time period (e.g. 100 milliseconds), the state variable circuit 108 transfers the state signal from the first state to a second state and then keeps the state signal in the second state. Here, the state signal is a logical signal, the first state is a low level (i.e., logic "0"), and the second state is a high level (i.e., logic "1"). However, it should be understood that the present invention is not limited thereto. The first state may also be a high level (i.e., logic "1"), and the second state may also be a low level (i.e., logic "0"). For example, the state variable circuit 108 may be a reset IC, a flip-flop, or a register.

Specially, in the present exemplary embodiment, when the memory controller 102 is enabled, the memory controller 102 recognizes whether the memory storage apparatus 100 is either just powered on to be activated or waken up from a suspend operation (e.g. a sleep mode) according to a state of the state signal output from the memory storage apparatus 100. If the memory storage apparatus 100 is activated by being powered on just now, the memory controller 102 performs a first procedure for initialization, or otherwise, the memory controller 102 performs a second procedure to quickly enter an operation mode. Hereinafter, the first procedure and the second procedure will be described in more detail with reference to the drawings.

The power management circuit 110 is coupled to the state variable circuit 108 and the memory controller 102 and configured to control the power of the memory storage apparatus 100. In particular, the power management circuit 110 is configured to receive an input voltage and supply an output voltage to elements (e.g. the memory controller 102, the buffer memory 106 and the rewritable non-volatile memory module 104) in the memory storage apparatus 100. Specially, in the present exemplary embodiment of the present invention, when receiving the first signal from the host system 1000, the memory controller 102 outputs the second signal, and when receiving the second signal, the power management circuit 110 stops supplying the output voltage to the memory controller 102, the buffer memory 106 and the rewritable non-volatile memory module 104. Here, the host system 1000 instructs the memory storage apparatus 100 to enter a sleep mode via the first signal.

Figure 3:
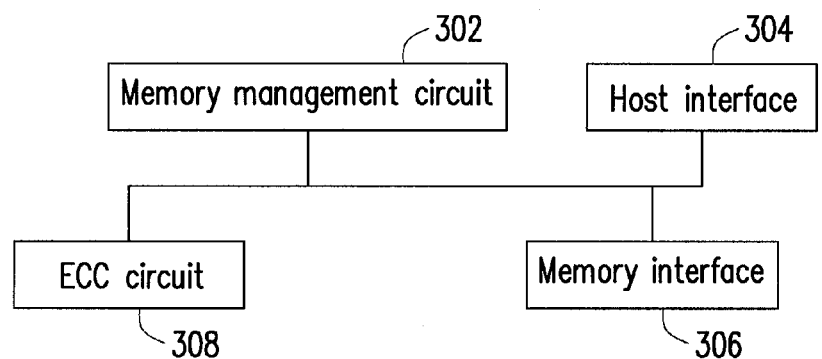
FIG. 3 is a schematic block diagram illustrating a memory controller according to an exemplary embodiment of the present invention.

FIG. 3 is a schematic block diagram of a memory controller according to an exemplary embodiment of the present disclosure. It should be understood that the memory controller depicted in FIG. 3 is merely exemplary, and the present invention is not limited thereto.

Referring to FIG. 3, the memory controller 102 includes a memory management circuit 302, a host interface 304, a memory interface 306 and an error checking and correcting (ECC) circuit 308.

The memory management circuit 302 is configured to control the whole operation of the memory controller 102. Particularly, the memory management circuit 302 has a plurality of control instructions. When the memory storage apparatus 100 is operated, the control instructions are executed to perform operations, such as data writing, data reading, a data erasing, and so on.

In the present exemplary embodiment, the control instructions of the memory management circuit 302 are implemented in a firmware form. For instance, the memory management circuit 302 has a microprocessor unit (not shown) and a read-only memory (ROM, not shown), and the control instructions are burning recorded in the ROM. When the memory storage apparatus 100 is operated, the control instructions are executed by the microprocessor unit to perform the operations, such as data writing, data reading, data erasing, and so on.

In another exemplary embodiment of the present invention, the control instructions of the memory management circuit 302 are stored as program codes in a specific area (e.g. a system area in a memory module exclusively used for storing system data) of the rewritable non-volatile memory module 104. Additionally, the memory management circuit 302 has a microprocessor unit (not shown), a read-only memory (ROM, not shown) and a random access memory (RAM, not shown). In particular, the ROM has a boot code, and when the memory controller 102 is enabled, the microprocessor unit first executes the boot code to load the control instructions from the rewritable non-volatile memory module 104 into the RAM of the memory management circuit 302. The microprocessor unit then executes the control instructions to perform the operation, such as data writing, data reading, and data erasing.

Furthermore, in another exemplary embodiment of the present invention, the control instructions of the memory management circuit 302 are implemented in a hardware form. For example, the memory management circuit 302 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. The memory cell management circuit is configured to manage the physical blocks of the rewritable non-volatile memory module 104, the memory writing circuit is configured to give the write command to the rewritable non-volatile memory module 104 to write data into the rewritable non-volatile memory module 104, the memory reading circuit is configured to give the read command to the rewritable non-volatile memory module 104 to read data from the rewritable non-volatile memory module 104, the memory erasing circuit is configured to give the erase command to the rewritable non-volatile memory module 104 to erase data in the rewritable non-volatile memory module 104, and the data processing circuit is configured to process data to be written into the rewritable non-volatile memory module 104 and data read from the rewritable non-volatile memory module 104.

The host interface 304 is coupled to the memory management circuit 302 and configured to receive and identify commands and data transmitted by the host system 1000. In the present exemplary embodiment, the host interface 304 complies with the serial advanced technology attachment (SATA) standard. However, it should be understood that the present invention is not limited thereto, and the host interface 304 may also comply with the Institute of Electrical and Electronic Engineers (IEEE) 1394 standard, the parallel advanced technology attachment (PATA) standard, the peripheral component interconnect express (PCI express) standard, the universal serial bus (USB) standard, the secure digital (SD) standard, the memory stick (MS) standard, the multi media card (MMC) standard, the compact flash (CF) standard, the integrated device electronics (IDE) standard, or other suitable standards.

The memory interface 306 is coupled to the memory management circuit 302 and configured to access the rewritable non-volatile memory module 104. In other words, the data to be written into the rewritable non-volatile memory module 104 is converted to an acceptable format for the rewritable non-volatile memory module 104 by the memory interface 306.

The ECC circuit 308 is coupled to the memory management circuit 302 and configured to execute an error correcting procedure to ensure data accuracy. In particular, when the host interface 304 receives a write command from the host system 1000, the ECC circuit generates an error checking and correcting code (ECC code) for write data (i.e., an update data) corresponding to the write command, and the memory management circuit 302 writes the update data and the corresponding ECC code into the rewritable non-volatile memory module 104. Subsequently, when the memory management circuit 302 reads data from the rewritable non-volatile memory module 104, the memory management circuit 302 simultaneously reads the ECC code corresponding to the read data, and the ECC circuit 308 performs the error correcting procedure for the data read based on the ECC code.

Figure 4A:
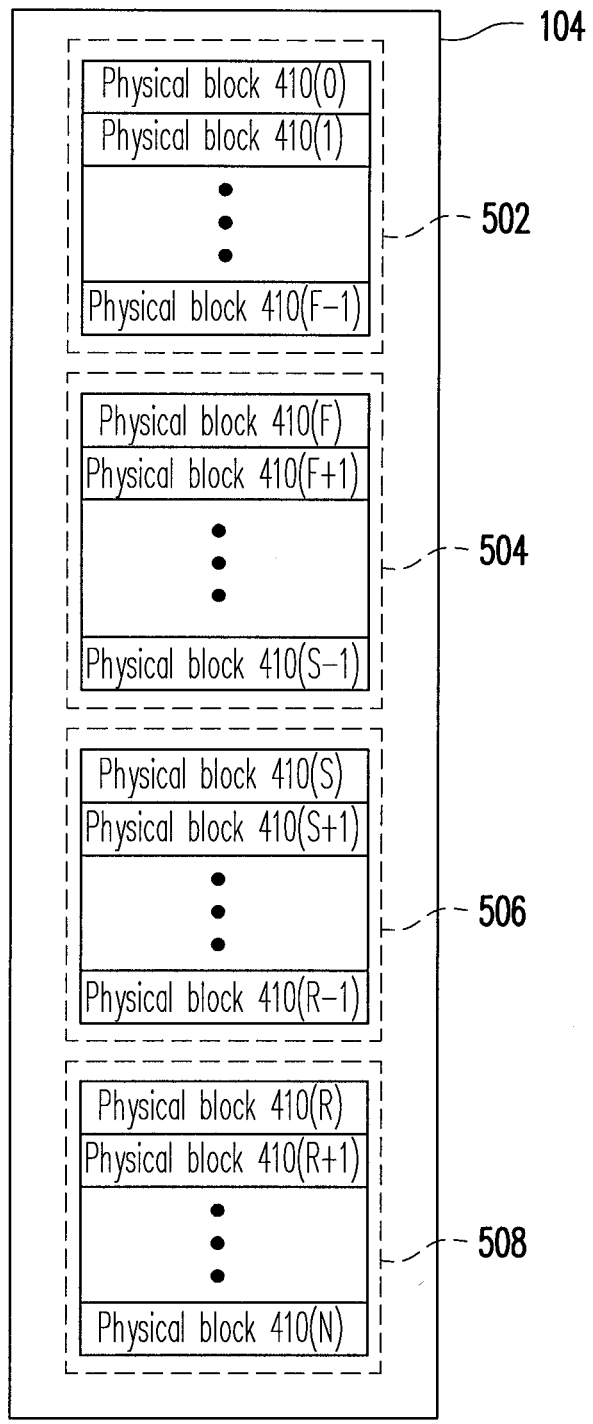
FIG. 4A and FIG. 4B are schematic diagrams illustrating management of physical blocks of a rewritable non-volatile memory module according to an exemplary embodiment of the present invention.
Figure 4B:
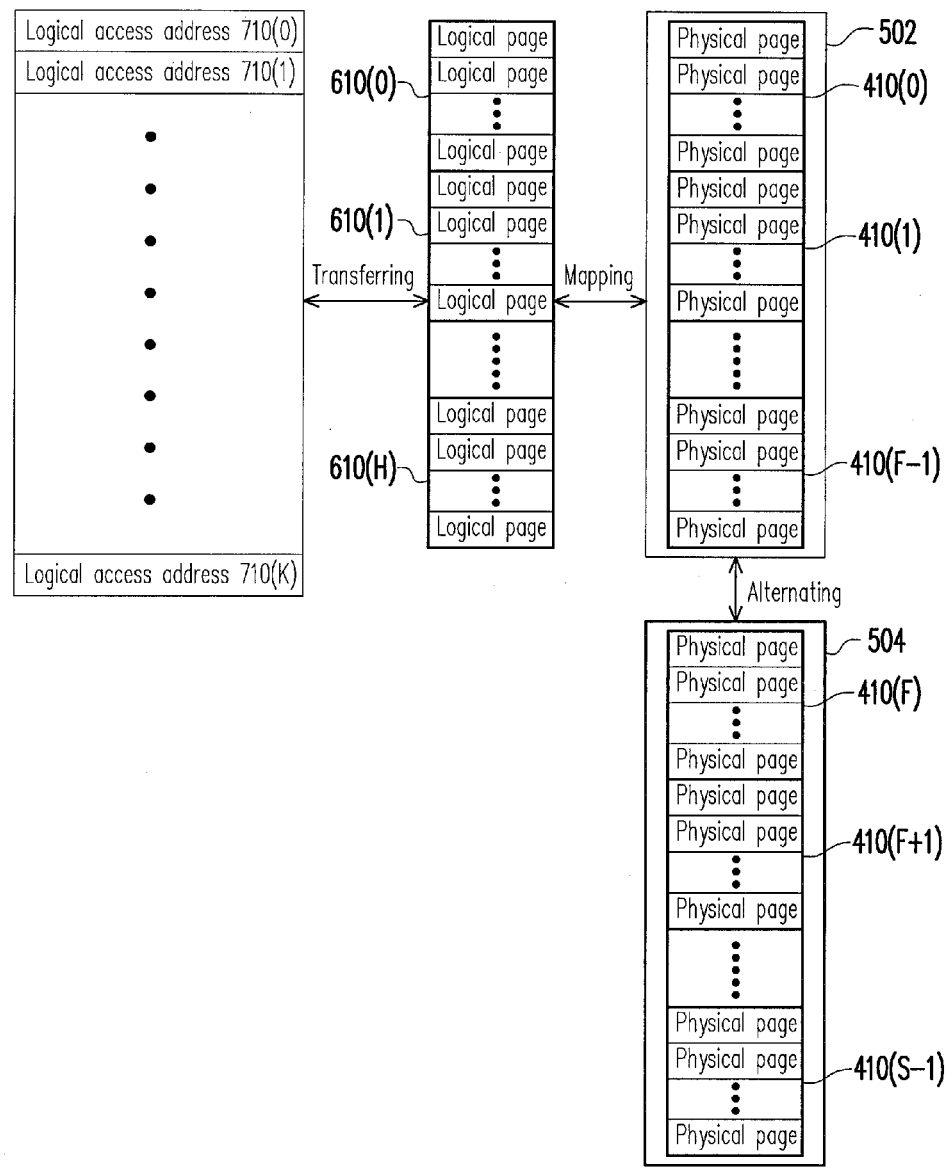

FIG. 4A and FIG. 4B are schematic diagrams of managing physical blocks in a rewritable non-volatile memory module according to an exemplary embodiment of the present invention.

Referring to FIG. 4A, the rewritable non-volatile memory module 104 has physical blocks 410(0)~410(N), and the memory management circuit 302 of the memory controller 102 logically groups (or assigns) the physical blocks 410(0)~410(N) into a data area 502, a spare area 504, a system area 506, and a replacement area 508.

The physical blocks logically belonging to the data area 502 and the spare area 504 are configured for storing data from the host system 1000. In particular, the physical blocks (also referred to as data physical blocks) in the data area 502 are considered as physical blocks where data has been stored, and physical blocks (also referred to as spare physical blocks) in the spare area 504 are physical blocks used for writing a new data. For instance, when the write command and the data to be written are received from the host system 1000, the memory management circuit 302 gets a physical block from the spare area 504, organizes the data to be written and writes the data into the gotten physical block. In addition, when performing a data merge operation on a certain logical block, the memory management circuit 302 gets a physical block from the spare area 504 as a new data physical block corresponding to such logical block, reads valid data belonging to the logical block from the rewritable non-volatile memory module 104, organizes the valid data, writes the organized valid data into the new data physical block, and then re-maps such logical block to the new data physical block. Specifically, after the data merge operation is completed, the memory management circuit 302 re-associates (or recycles) the data physical block storing invalid data to the spare area 504 for performing a new data writing operation next time. For instance, the memory management circuit 302 performs the erasing operation on the physical block before the physical block is associated to the spare area 504, or alternatively, when the physical block is gotten from the spare area 504, so that the physical block gotten from the spare area 504 may be a blank physical block for writing data.

The physical blocks logically belonging to the system area 506 are configured for recording system data. For instance, the system data includes the manufacturers and models of the rewritable non-volatile memory module, the number of physical blocks in the rewritable non-volatile memory modules, the number of physical pages in each physical block, and so on.

The physical blocks logically belonging to the replacement area 508 are used in a bad physical block replacement procedure for replacing damaged physical blocks. Particularly, if there are still normal physical blocks in the replacement area 508, and a physical block in the data area 502 is damaged, the memory management circuit 302 gets a normal physical block from the replacement area 508 for replacing the damaged physical block.

Based on the above, during the operation of the memory storage apparatus 100, the physical blocks in the data area 502, the spare area 504, the system area 506, and the replacement area 508 are dynamically changed. For example, the physical blocks used for alternatively storing data changeably belong to either the data area 502 or the spare area 504.

It should be mentioned that in the present exemplary embodiment, the memory management circuit 302 manages the rewritable non-volatile memory module 104 in a unit of each physical block. However, the present invention is not limited thereto, and in another exemplary embodiment, the memory management circuit 302 may also group the physical blocks into a plurality of physical units and manages the rewritable non-volatile memory module 104 in a unit of each physical unit. For example, each physical unit may be constituted by at least one physical block in the same memory die or in different memory dies.

Referring to FIG. 4B, the memory management circuit 302 configures logical blocks 610(0)~610(H) for mapping to the physical blocks in the data area 502. Each of the logical blocks has a plurality of logical pages, and the logical pages are mapped to the corresponding physical pages in the data physical block. For instance, when the memory storage apparatus 100 is formatted, the logical blocks 610(0)~610(H) are initially mapped to the physical blocks 410(0)~410(F-1) in the data area 502.

In the present exemplary embodiment of the present invention, the memory management circuit 302 maintains a logical block-physical block mapping table to record a mapping relationship (i.e. the mapping information) between the logical blocks 610(0)~610(H) and the physical blocks in the data area 502. In addition, the host system 1000 accesses data by using a logical access address as a unit. For instance, a logical access address is a logical sector. When the host system 1000 accesses data, the memory management circuit 302 converts logical access addresses 710(0)~710(K) corresponding to the memory storage apparatus 100 into addresses in the corresponding logical pages. For instance, when the host system 1000 is about to access a certain logical access address, the memory management circuit 302 converts the logical access address accessed by the host system 1000 into a multi-dimensional address constituted by a corresponding logical block, a corresponding logical page, and a corresponding logical offset. And, the memory management circuit 302 accesses data in the corresponding physical page through the logical block-physical block mapping table. Here, an offset serves to position a logical (or a physical) address in a logical page (or a physical page) and to define a distance between the logical (or the physical) address and a starting address of the logical page (or the physical page), wherein the logical (or the physical) address is also referred to as a logical (or a physical) offset address.

Figure 5:
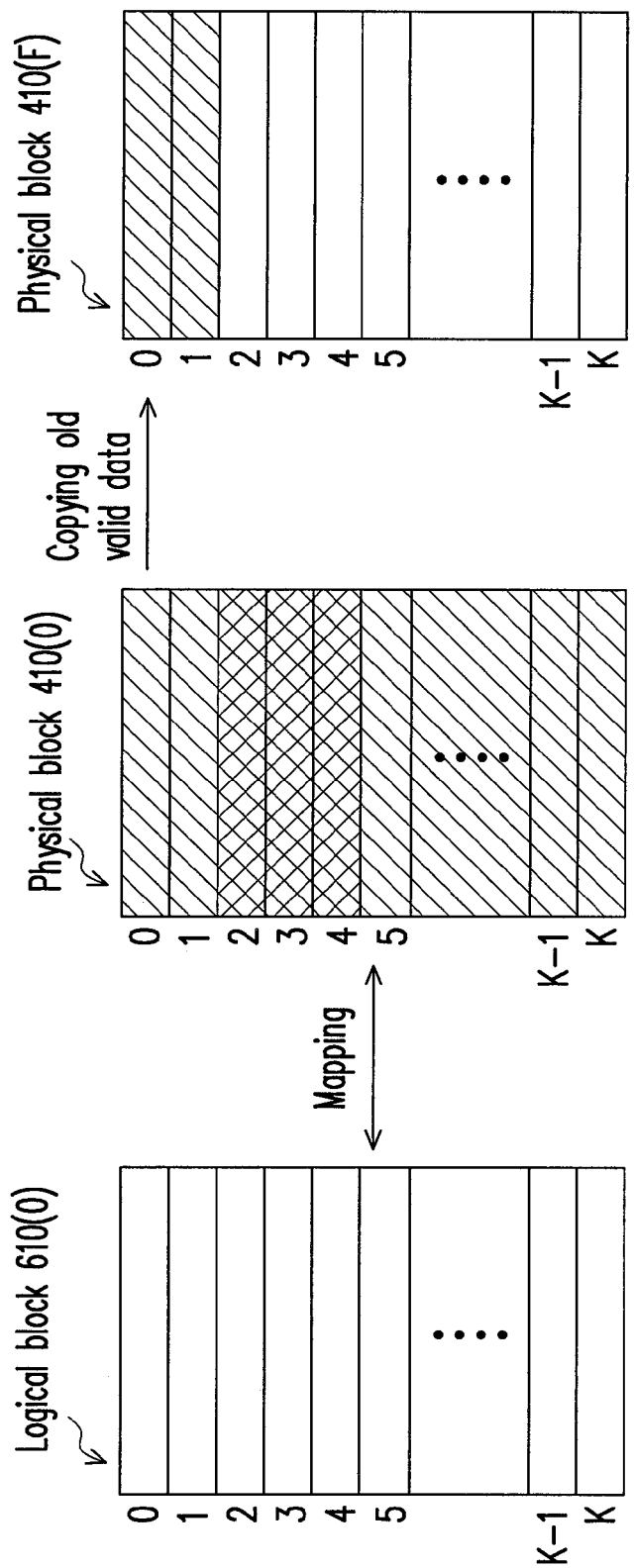
FIG. 5 through FIG. 6 illustrate examples of writing update data using substitution physical blocks according to an exemplary embodiment of the present invention.
Figure 6:
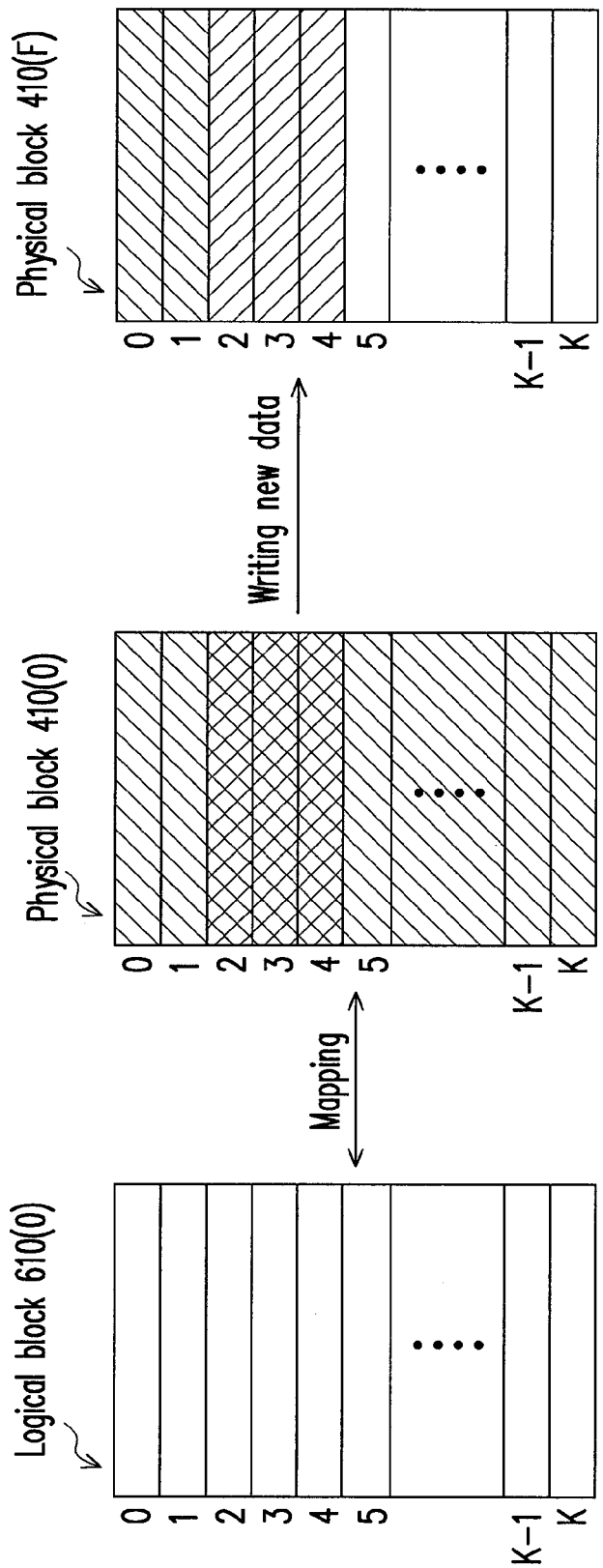

FIG. 5 through FIG. 6 illustrate examples of writing update data using substitution physical blocks according to an exemplary embodiment of the present invention.

Referring to FIG. 5 with FIG. 6, for instance, under a mapping condition that the logical block 610(0) is mapped to the physical block 410(0), when the memory controller 102 receives a write command from the host system 1000 to write the update data into the logical pages belonging to the logical block 610(0), the memory controller 102 identifies that the logical block 610(0) is currently mapped to the physical block 410(0) based on the logical block-physical block mapping table and gets the physical block 410(F) from the spare area 504 to write the update data. However, during a process of writing the update data into the physical block 410(F), the memory controller 102 does not instantly move all the valid data from the physical block 410(0) to the physical block 410(F) to erase the physical block 410(0). Specifically, the memory management circuit 302 reads the valid data (i.e., data in the $0^{th}$ physical page and the $1^{st}$ physical page of the physical block 410(0)) from the physical block 410(0) before the physical page to be written. Afterward, the memory management circuit 302 writes the valid data before the physical page for writing the data in the physical block 410(0) into the $0^{th}$ physical page and the $1^{st}$ physical page of the physical block 410(F) (as shown in FIG. 5) and writes the new data into the $2^{nd}$~$4^{th}$ physical pages of the physical block 410(F) (as shown in FIG. 6). At this time, the memory controller 102 completes the writing operation. Since the valid data in the physical block 410(0) probably becomes invalid a next operation (e.g., a write command), instantly moving all the valid data in the physical block 410(0) to the physical block 410(F) may become meaningless. Additionally, data must be written into the physical pages of the physical block according to a writing sequence of the physical pages, and thus, the memory management circuit 302 only moves the valid data (i.e., the data stored in the $0^{th}$ physical page and the $1^{st}$ physical page of the physical block 410(0)) before the physical page to be written first without moving the other valid data (i.e., the data stored in the $5^{th}$~$K^{th}$ physical pages of the physical block 410(0)). That is to say, the physical pages belonging to the physical blocks 410(0) and 410(F) are mapped to the logical pages belonging to the logical block 610(0).

In the present exemplary embodiment, the operation of temporarily maintaining such transient relationship is referred to as opening mother-child blocks. Besides, the original physical block (e.g., the physical block 410(0)) is referred to as a mother physical block or an updated physical block, and the physical block (e.g., the physical block 410(F)) for replacing the mother physical block is referred to as a child physical block or a substitution physical block. Here, the mother physical block and the child physical block configured for storing data belonging to the same logical block are collectively referred to as a mother-child block set.

It should be noted that the number of the physical blocks in the spare area 504 is limited, and accordingly, during the operation of the memory storage apparatus 100, the number of the currently opened mother-child block sets is limited as well. In other words, during the operation of the memory storage apparatus 100, the number of the opened mother-child block sets cannot be greater than a threshold number of mother-child blocks. For instance, in the present exemplary embodiment, the threshold number of mother-child blocks is set to 3, but the present invention is not limited thereto. Therefore, when the memory storage apparatus 100 receives the write command from the host system 1000, and if the number of the opened mother-child block sets reaches the threshold number, the memory controller 102 has to perform the data merge operation to close at least one of the opened mother-child block sets, so that the write command is then executed. Specifically, during the data merge operation, the memory controller 102 merges the data in the mother physical block and the child physical block into one physical block.

Figure 7:
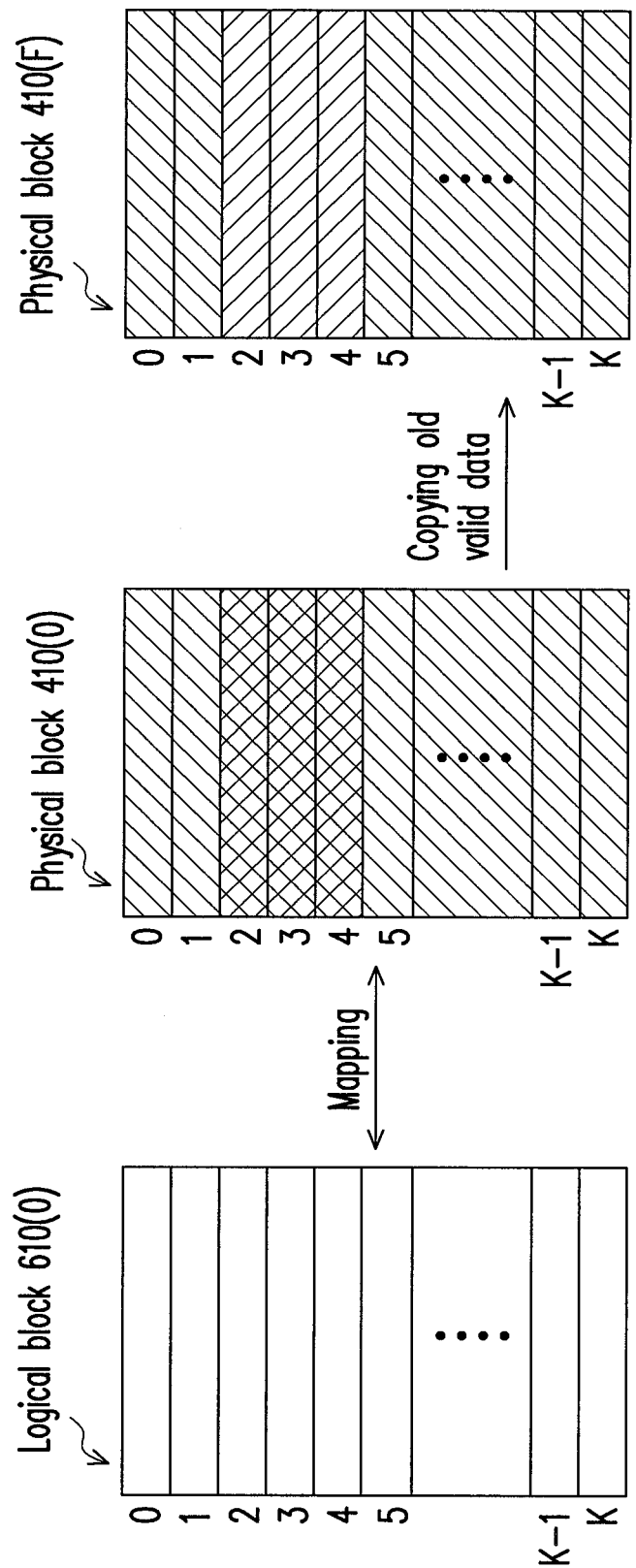
FIG. 7 illustrates an example of performing a data merge operation according to an exemplary embodiment of the present invention.

FIG. 7 illustrates an example of a data merge operation according to an exemplary embodiment of the present invention.

With reference to FIG. 7, if it is necessary to merge the valid data in the physical blocks 410(0) and 410(F) shown in FIG. 6, the memory management circuit 302 reads the remaining valid data from the physical block 410(0) (i.e., the data stored in the $5^{th}$~$K^{th}$ physical pages of the physical block 410(0)) and then writes the remaining valid data into the $5^{th}$~$K^{th}$ physical pages of the physical block 410(F). Then, the memory management circuit 302 associates the physical block 410(F) with the data area 502. Namely, the memory management circuit 302 re-maps the logical block 610(0) to the physical block 410(F) in the logical block-physical block mapping table. In addition, the memory management circuit 302 performs the erasing operation on the physical block 410(0) and associates the erased physical block 410(0) with the spare area 504. For instance, in the present exemplary embodiment, the memory management circuit 302 establishes a spare area physical block table (not shown) to record the physical blocks currently associated with the spare area 504.

During the operation of opening the mother-child physical blocks, the logical pages of the logical blocks are mapped to different physical pages of physical blocks, and thus, for example, the memory management circuit 302 uses a variable table to record the transient relationship between the logical blocks and the mother-child physical blocks.

In the present exemplary embodiment, during the operation of the memory storage apparatus 100, the logical block-physical block table and the variable table are loaded into the buffer memory 106. Meanwhile, when performing the write operation, the logical block-physical block table and the variable table temporarily stored in the buffer memory 106 are updated immediately for subsequent access. Besides, when the memory storage apparatus 100 is turned off, the logical block-physical block table and the variable table are stored in the rewritable non-volatile memory module 104. Then, when the memory storage apparatus 100 is re-activated, the logical block-physical block table and the variable table are re-loaded into the buffer memory 106. However, due to an abnormal power failure of the memory storage apparatus 100, the most updated logical block-physical block table and the variable table are possibly not stored back in the rewritable non-volatile memory module 104. In addition, when programming the physical pages, the memory management circuit 302 records the logical address mapped to the physical page in the redundancy bit area of the physical page. Meanwhile, when the memory storage apparatus 100 is powered on, not only the logical block-physical block table and the variable table are loaded into the buffer memory 106, but also the memory management circuit 302 scans the redundancy bit areas of the physical pages of the physical blocks and updates the loaded logical block-physical block table and the variable according to the information in the redundancy bit areas of the physical pages of the physical blocks. Here, the operations of the memory storage apparatus 100, such as being re-powered on to load the logical block-physical block table and the variable table, scanning the redundancy bit areas, updating the logical block-physical block table and the variable table and so forth are referred to as the first procedure.

Beside the first procedure as described above, in the present exemplary embodiment of the present invention, when the memory storage apparatus 100 is waken up from the sleep mode, the memory management circuit 302 quickly enters an operation mode by the second procedure. In particular, when the memory storage apparatus 100 receives the first signal from the host system 1000, the memory management circuit 302 quickly stores the logical block-physical block table and the variable table temporarily stored in the buffer memory 106 in an unused physical block and afterward, outputs the second signal so that the memory storage apparatus 100 enters the sleep mode. Meanwhile, when the memory storage apparatus 100 is waken up, the memory management circuit 302 loads the logical block-physical block table and the variable table from the rewritable non-volatile memory module 104 to the buffer memory 106 so as to return to the operation mode. Specially, since the logical block-physical block table and the variable table before entering the sleep mode is the latest, after the logical block-physical block table and the variable table are loaded, it is not necessary for the memory management circuit 302 to perform the operations such as scanning the redundancy bit areas of the physical pages of the physical blocks and updating the logical block-physical block table and the variable table. Accordingly, based on the second procedure of the exemplary embodiments of the present invention, the memory storage apparatus 100 can return to the operation mode quickly.

Figure 8:
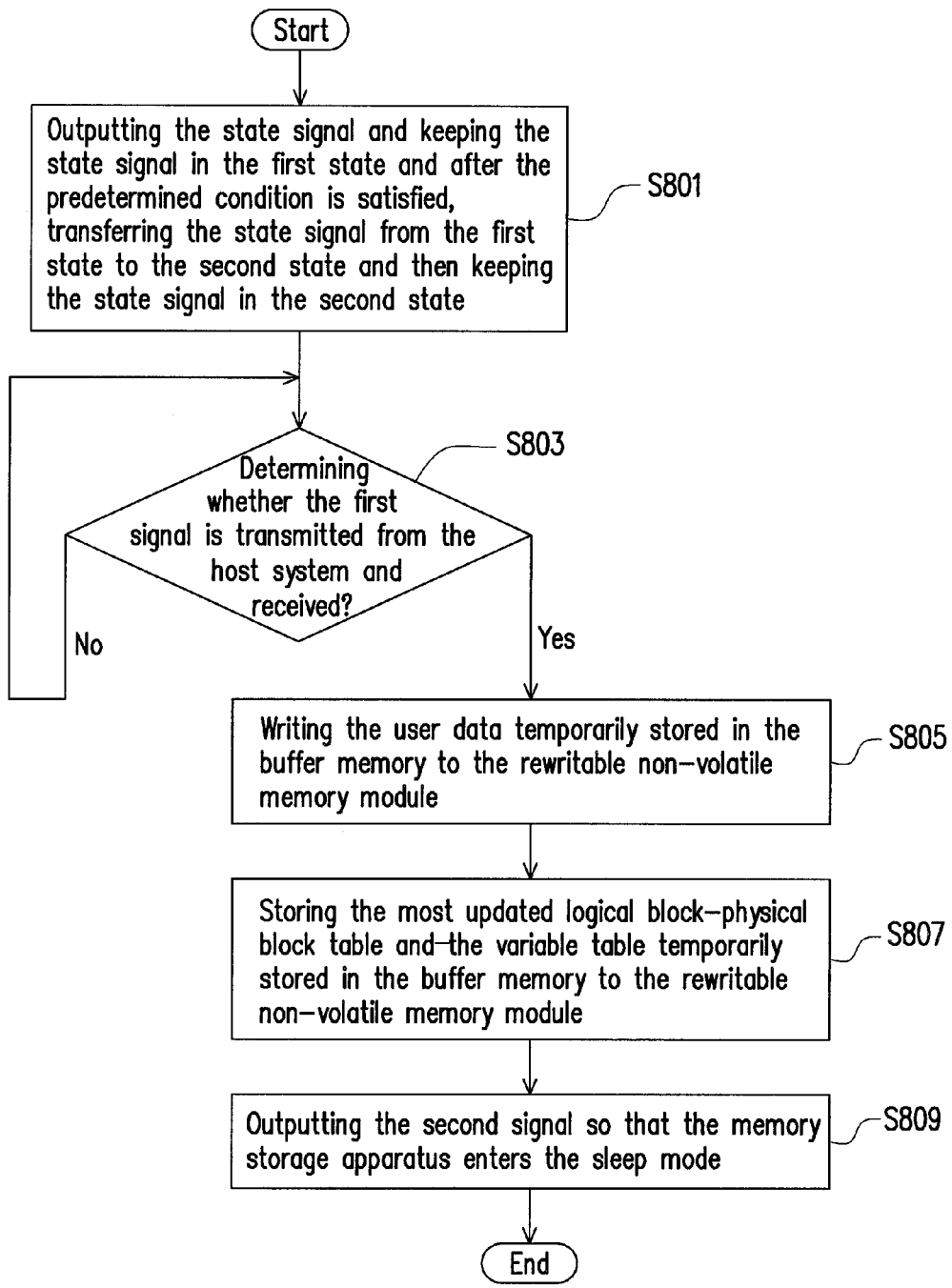
FIG. 8 is a flowchart illustrating a power control method of entering a sleep mode according to the present exemplary embodiment of the present invention.

FIG. 8 is a flowchart illustrating a power control method of entering a sleep mode according to the present exemplary embodiment of the present invention.

Referring to FIG. 8, when the memory storage apparatus 100 is powered on, in step S801, the state signal is output and kept in the first state, and after a predetermined condition is satisfied, the state signal is transferred from the first state to the second state and then kept in the second state.

In step S803, whether the first signal is transmitted from the host system and received is determined.

If the first signal is received, in step S805, the user data temporarily stored in the buffer memory 106 is written into the rewritable non-volatile memory module 104 (e.g. the writing operation as illustrated in FIG. 5 and FIG. 6). Then, in step S807, the most updated logical block-physical block table and the variable table temporarily stored in the buffer memory 106 is stored in the rewritable non-volatile memory module 104. Next, in step S809, the second signal is output so that the memory storage apparatus 100 enters the sleep mode.

If the first signal is not received, step S803 is performed to continuously monitor whether the first signal is received.

Figure 9:
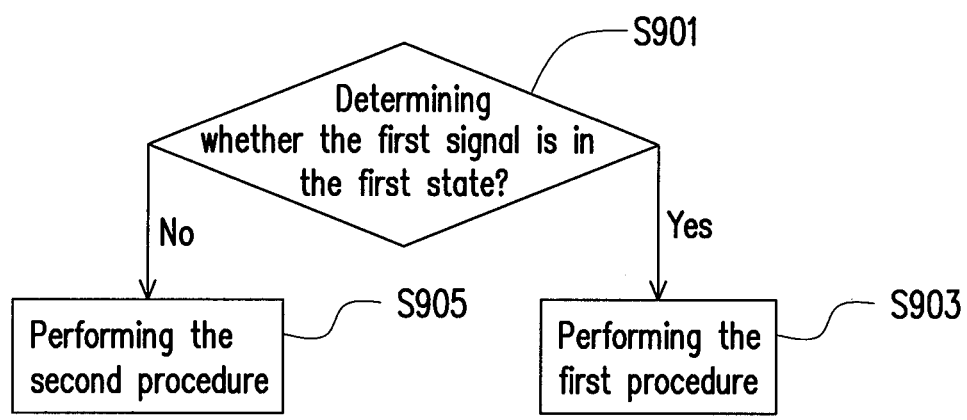
FIG. 9 is a flowchart of re-activation by a power control method according to the present exemplary embodiment of the present invention.

FIG. 9 is a flowchart of re-activation by a power control method according to the present exemplary embodiment of the present invention.

Referring to FIG. 9, when the memory controller 102 is enabled, in step S901, whether the state signal is in a first state is determined. If the state signal is in the first state, in step S903, the first procedure is performed. For example, in step S903, the logical block-physical block table and the variable table are loaded from the rewritable non-volatile memory module 104 into the buffer memory 106, the redundancy bit areas of the physical pages of the physical blocks are scanned and the logical block-physical block table and the variable table that are loaded are updated according to the information in the redundancy bit areas of the physical pages of the physical blocks.

If the state signal is not in the first state, in step S905, the second procedure is performed. For example, in step S905, the latest logical block-physical block table and the variable table are loaded from the rewritable non-volatile memory module 104 into the buffer memory 106.

In order to describe in detail how the memory controller 102 outputs the second signal based on the first signal to allow the memory storage apparatus 100 to enter the sleep mode and how the memory controller 102 recognizes whether the memory storage apparatus 100 is just powered on or waken up from the sleep mode according the state signal, an exemplary circuit diagram will be used to described hereinafter how the memory controller 102, the state variable circuit 108 and the power management circuit 110 are operated.

Figure 10:
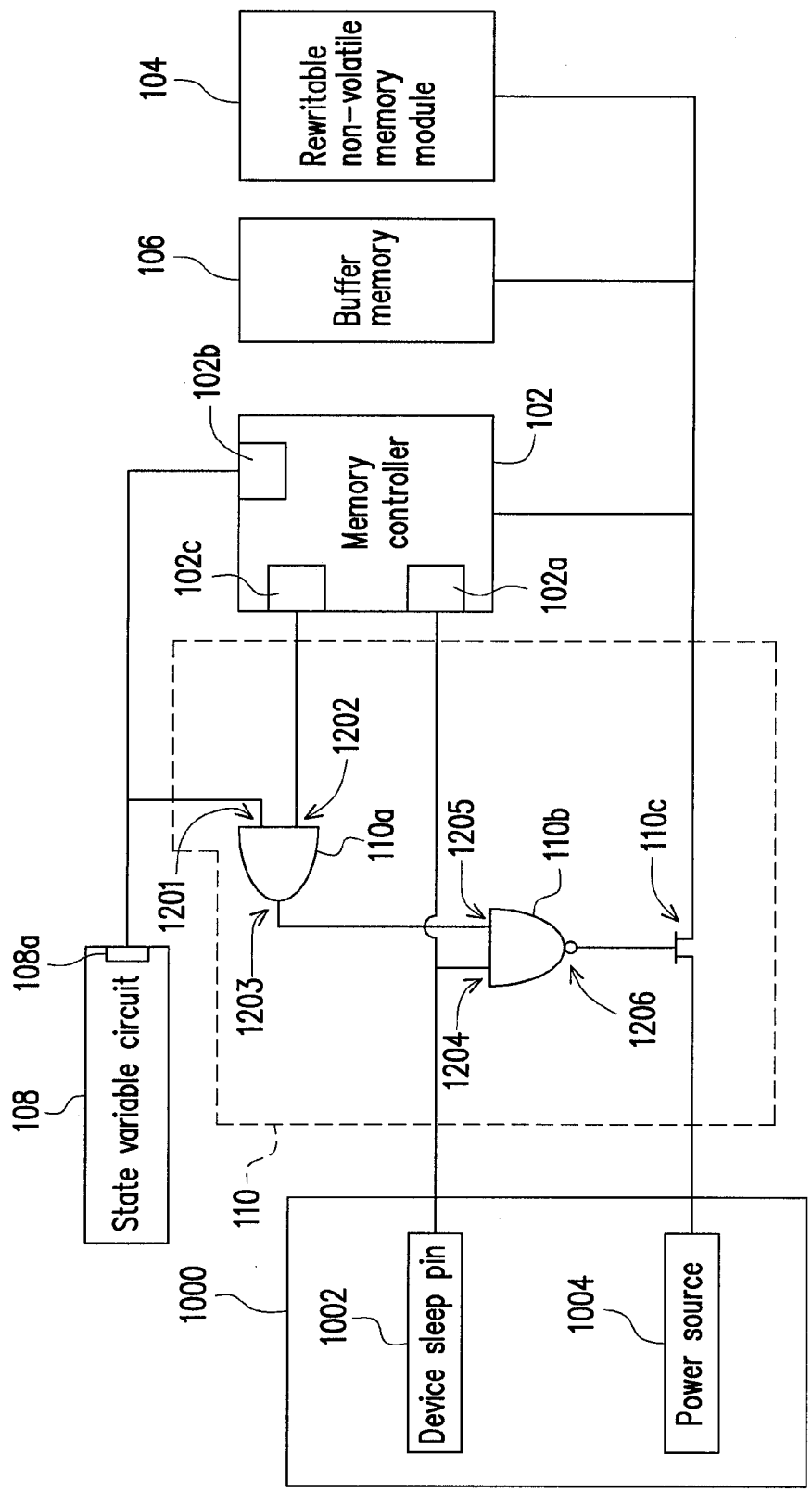
FIG. 10 is a schematic diagram illustrating a detailed logic circuit of a power management circuit and how the power management circuit is coupled to a memory controller, a state variable circuit and a host system according to an exemplary embodiment of the present invention.

FIG. 10 is a schematic diagram illustrating a detailed logic circuit of a power management circuit and how the power management circuit is coupled to a memory controller, a state variable circuit and a host system according to an exemplary embodiment of the present invention. It is to be understood that FIG. 10 is merely an exemplary embodiment of the present invention and is not intent to limit the present invention.

Referring to FIG. 10, the memory controller 102 has a first universal input terminal 102a, a second universal input terminal 102b and a universal output terminal 102c.

The first universal input terminal 102a is coupled to a device sleep pin 1002 of the host system 1000 to receive the first signal. The second universal input terminal 102b is coupled to an output terminal 108a of the state variable circuit 108 and configured to receive the state signal. The universal output terminal 102c is coupled to the power management circuit 110 and configured to output the second signal.

The power management circuit 110 has an AND gate 110a, an NAND gate 110b and a switch circuit 110c.

The AND gate has a first input terminal 1201, a second input terminal 1202, and an output terminal 1203. As shown in FIG. 10, the first input terminal 1201 of the AND gate 110a is coupled to the output terminal 108a of the state variable circuit 108, and the second input terminal 1202 of the AND gate 110a is coupled to the universal output terminal 102c of the memory controller 102.

The NAND gate 110b has a first input terminal 1204, a second input terminal 1205, and an output terminal 1206. Referring to FIG. 10, the first input terminal 1204 of the NAND gate 110b is coupled to the device sleep pin 1002 of the host system 1000, and the second input terminal 1205 of the NAND gate 110b is coupled to the output terminal 1203 of the AND gate 110a.

The switch circuit 110c is coupled to the output terminal 1206 of the NAND gate 110b, a power source 1004 of the host system 1000, the memory controller 102, the buffer memory 106 and the rewritable non-volatile memory module 104. In this example, when a signal in the second state is received by the output terminal 1206 of the NAND gate 110b, the switch circuit 110c supplies an output voltage to the memory controller 102, the buffer memory 106 and the rewritable non-volatile memory module 104. Otherwise, when a signal in the first state is received by the output terminal 1206 of the NAND gate 110b, the switch circuit 110c stops supplying the output voltage to the memory controller 102, the buffer memory 106 and the rewritable non-volatile memory module 104. For instance, the switch circuit 110c may be a MOS switch circuit, but the present invention is not limited thereto, and any other switch circuit provided with the same function may be applied to the present invention.

In this example, when the memory storage apparatus 100 is powered on by the power source 1004 of the host system 1000, the switch circuit 110c receives the input voltage and supplies the output voltage to the memory controller 102, the buffer memory 106 and the rewritable non-volatile memory module 104. The output terminal 108a of the state variable circuit 108 outputs the state signal in the first state and kept in the first state, and after a predetermined time period, transfers the state signal from the first state to the second state and then keeps the state signal in the second state. In addition, the host system 100 initially keeps the device sleep pin 1002 in the first state, and the memory controller 102 initially keeps the universal output terminal 102c in the first state. Accordingly, the output terminal 1203 of the AND gate 110a outputs a signal in the first state, the output terminal 1206 of the NAND gate 110b outputs a signal in the second state, and the switch circuit 110c supplies the output voltage to the memory controller 102, the buffer memory 106 and the rewritable non-volatile memory module 104.

When the host system 1000 is about to output the first signal to the memory storage apparatus 100, the host system 1000 keeps the device sleep pin 1002 in the second state. And, when the memory controller 102 detects that the first universal input terminal 102a is in the second state, the memory controller 102 keeps the universal output terminal 102c in the second state. Accordingly, the output terminal 1203 of the AND gate 110a outputs the signal in the second state, the output terminal 1206 of the NAND gate 110b outputs the signal in the first state, and the switch circuit 110c stops supplying the output voltage to the memory controller 102, the buffer memory 106 and the rewritable non-volatile memory module 104. Thereby, the memory storage apparatus 100 enters the sleep mode.

Figure 11:
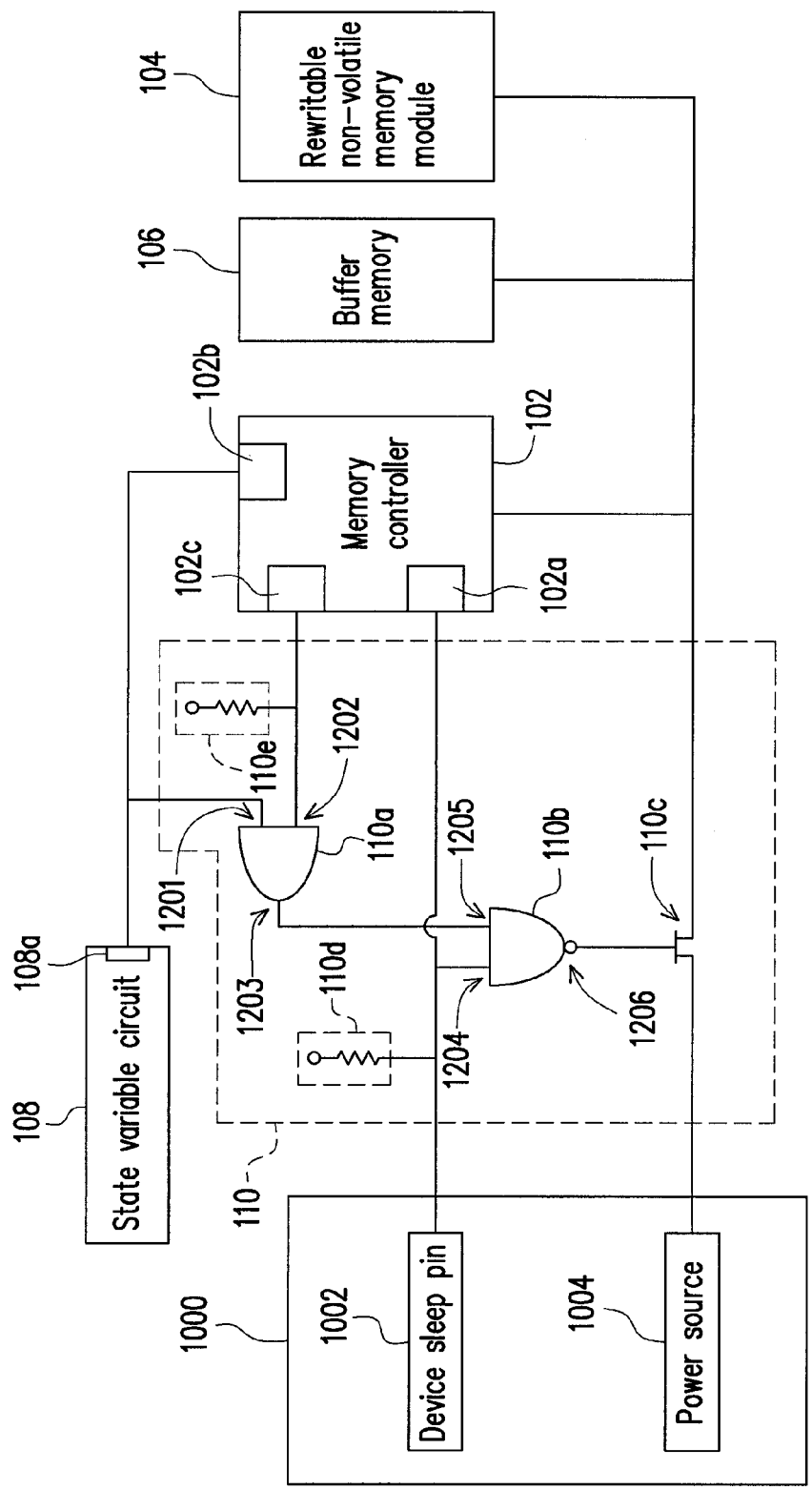
FIG. 11 is a schematic diagram illustrating a detailed logic circuit of a power management circuit and how the power management circuit is coupled to a memory controller, a state variable circuit and a host system according to another exemplary embodiment of the present invention.

FIG. 11 is a schematic diagram illustrating a detailed logic circuit of a power management circuit and how the power management circuit is coupled to a memory controller, a state variable circuit and a host system according to another exemplary embodiment of the present invention.

With reference to FIG. 11, comparing with the circuit as shown in FIG. 10, the power management circuit 110 further includes a first voltage maintenance circuit 110d and a second voltage maintenance circuit 110e.

One terminal of the first voltage maintenance circuit 110d is coupled to the first input terminal 1204 of the NAND gate 110b and the first universal input terminal 102a of the memory storage apparatus 102, and the other terminal of the first voltage maintenance circuit 110d is coupled to a power source (e.g. the power source 1004). In this example, when the host system does not keep the device sleep pin 1002 in the first state, the first voltage maintenance circuit 110d keeps the first input terminal 1204 of the NAND gate 110b and the first universal input terminal 102a of the memory controller 102 in the second state. That is to say, in the example as illustrated in FIG. 10, the host system 1000 transmits the first signal by keeping the device sleep pin 1002 in the second state. On the contrary, in the example as illustrated in FIG. 11, the host system 1000 transmits the first signal by not keeping the device sleep pin 1002 in the first state.

One terminal of the second voltage maintenance circuit 110e is coupled to the second input terminal 1202 of the AND gate 110a and the universal output terminal 102c of the memory controller 102, and the other terminal of the second voltage maintenance circuit 110e is coupled to a power source (e.g. the power source 1004). In this example, when the memory controller 102 does not keep the universal output terminal 102c in the first state, the second voltage maintenance circuit 110e keeps the second input terminal 1202 of the AND gate 110a in the second state. That is to say, in the example as illustrated in FIG. 10, the memory controller 102 outputs the second signal by keeping the universal output terminal 102c in the second state. On the contrary, in the example as illustrated in FIG. 11, the memory controller 102 outputs the second signal by not keeping the universal output terminal 102c in the first state so as to complete the sleep mode.

In the exemplary embodiment, when the host system 1000 does not keep the device sleep pin 1002 in the first state, the first universal input terminal 102a of the memory controller 102 detects that the device sleep pin 1002 is in the second state and does not keep the universal output terminal 102c in the first state so as to complete the sleep mode.

Besides, in the present exemplary embodiment, after the memory storage apparatus 100 is powered on for a predetermined time period, the state variable circuit 108 transfers the state signal from the first state to the second state and keeps the state signal in the second signal. However, in another present exemplary embodiment of the present invention, the state variable circuit 108 may also transfers the state signal to the second state after the memory storage apparatus 110 is powered on, and the second voltage maintenance circuit 110*e* is transferred in the first state.

Based on the above, in the memory storage apparatus, the memory controller thereof and the power control method thereof according to the exemplary embodiments of the present invention, when receiving the first signal, the memory controller 102, the buffer memory 106 and the rewritable non-volatile memory module 104 are in a condition where no power is supplied, and thus, the power consumption of the memory storage apparatus in the sleep mode can be effectively reduced. Furthermore, in the memory storage apparatus, the memory controller thereof and the power control method thereof according to the exemplary embodiments of the present invention, when being enabled, the memory controller recognizes whether the memory storage apparatus is just powered on or waken up from the sleep mode according to the state signal received by the state variable circuit, wherein the second procedure is performed when the memory storage apparatus is waken up from the sleep mode so that the memory storage apparatus can quickly return to normal operation. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory storage apparatus, comprising:
a rewritable non-volatile memory module, having a plurality of physical blocks;
a first circuit, outputting a state signal, wherein when the first circuit is enabled, the first circuit keeps the state signal in a first state and after a predetermined condition is satisfied, the first circuit transfers the state signal from the first state to a second state and keeps the state signal in the second state;
a memory controller, coupled to the first circuit and the rewritable non-volatile memory module and configured to receive the state signal from the first circuit; and
a power management circuit, coupled to the first circuit and the memory controller and configured to receive an input voltage and supply an output voltage to the rewritable non-volatile memory module and the memory controller after the memory storage apparatus is powered on,
wherein the memory controller is further configured to output a second signal when the memory controller receives a first signal from a host system, and the power management circuit is further configured to stop outputting the output voltage when the memory controller outputs the second signal, and
wherein the memory controller is further configured to determine whether the state signal is in the first state when the memory controller is enabled, and if the state signal is in the first state, the memory controller performs a first procedure, and if the state signal is not in the first state, the memory controller performs a second procedure.

2. The memory storage apparatus as recited in claim 1, wherein the memory controller comprises:
a first universal input terminal, coupled to a device sleep pin of the host system and configured to receive the first signal;
a second universal input terminal, coupled to an output terminal of the first circuit and configured to receive the state signal; and
a universal output terminal, coupled to the power management circuit and configured to output the second signal.

3. The memory storage apparatus as recited in claim 2, wherein the power management circuit comprises:
a AND gate, having a first input terminal, a second input terminal and an output terminal, wherein the first input terminal of the AND gate is coupled to the output terminal of the first circuit, and the second input terminal of the AND gate is coupled to the universal output terminal;
a NAND gate, having a first input terminal, a second input terminal and an output terminal, wherein the first input terminal of the NAND gate is coupled to the device sleep pin of the host system, and the second input terminal of the NAND gate is coupled to the output terminal of the AND gate; and
a switch circuit, coupled to the output terminal of the NAND gate and the memory controller and configured to receive the input voltage,
wherein the host system keeps the device sleep pin in the second state to output the first signal,
wherein the memory controller keeps the universal output terminal in the second state to output the second signal,
wherein the switch circuit is further configured to output the output voltage when a signal that is in the second state is received from the output terminal of the NAND gate, and
wherein the switch circuit is further configured to stop outputting the output voltage when a signal that is in the first state is received from the output terminal of the NAND gate.

4. The memory storage apparatus as recited in claim 3, wherein the power management circuit further comprises:
a first voltage maintenance circuit, having one terminal coupled to the first input terminal of the NAND gate and the first universal input terminal of the memory controller, wherein first voltage maintenance circuit keeps the first input terminal of the NAND gate and the first universal input terminal of the memory controller in the second state when the host system does not keep the device sleep pin in the first state; and
a second voltage maintenance circuit, having one terminal coupled to the second input terminal of the AND gate and the universal output terminal of the memory controller, wherein the second voltage maintenance circuit keeps the second input terminal of the AND gate in the second state when the memory controller does not keep the universal output terminal in the first state.

5. The memory storage apparatus as recited in claim 1, further comprising a buffer memory coupled to the memory controller and the power management circuit,
wherein before outputting the second signal, the memory controller is further configured to writes user data temporarily stored in the buffer memory into the rewritable non-volatile memory module and store a mapping information and a variable table corresponding to the plurality of physical blocks in the rewritable non-volatile memory module.

6. The memory storage apparatus as recited in claim 5, wherein the memory controller is further configured to perform the first procedure to scan redundancy bit areas of the physical blocks of the rewritable non-volatile memory module and update the mapping information and the variable table corresponding to the plurality of physical blocks according to information recorded in the redundancy bit areas of the physical blocks of the rewritable non-volatile memory module.

7. The memory storage apparatus as recited in claim 5, wherein the memory controller is further configured to perform the second procedure to load the mapping information and the variable table corresponding to the plurality of physical blocks from the rewritable non-volatile memory module.

8. The memory storage apparatus as recited in claim 1, wherein the predetermined condition is satisfied after the state signal is output for a predetermined time period.

9. The memory storage apparatus as recited in claim 2, wherein the predetermined condition is satisfied when the universal output terminal is in the first state.

10. The memory storage apparatus as recited in claim 4, wherein when the host system does not keep the device sleep pin in the first state, the first universal input terminal of the memory controller detects that the device sleep pin is in the second state and does not keep the universal output terminal in the first state so as to enter a sleep mode.

11. A memory controller disposed in a memory storage apparatus, wherein the memory storage apparatus has a first circuit, a power management circuit and a rewritable non-volatile memory module, and the rewritable non-volatile memory module has a plurality of physical blocks, the memory controller comprising:
 a host interface, configured to be coupled to a host system;
 a memory interface, configured to be coupled to the rewritable non-volatile memory module; and
 a memory management circuit, coupled to the host interface, the memory interface and the first circuit,
 wherein the memory management circuit is configured to output a second signal when receiving a first signal from the host system, and the power management circuit is configured to stop outputting an output voltage to the memory controller and the rewritable non-volatile memory module when the memory controller outputs the second signal,
 wherein when the first circuit is enabled, the first circuit is configured to output a state signal and keep the state signal in a first state, and after a predetermined condition is satisfied, the first circuit is configured to transfer the state signal from the first state to a second state and then keeps the state signal in the second state, and
 wherein when the memory management circuit is enabled, the memory management circuit is further configured to determine whether the state signal is in the first state,
 wherein if the state signal is in the first state, the memory management circuit performs a first procedure,
 wherein if the state signal is not in the first state, the memory management circuit performs a second procedure.

12. The memory controller as recited in claim 11, wherein the memory storage apparatus further comprises a buffer memory coupled to the memory management circuit and the power management circuit,
 wherein before outputting the second signal, the memory management circuit is further configured to write user data temporarily stored in the buffer memory into the rewritable non-volatile memory module and store a mapping information and a variable table corresponding to the plurality of physical blocks in the rewritable non-volatile memory module.

13. The memory controller as recited in claim 12, wherein the memory management circuit is further configured to perform the first procedure to scan redundancy bit areas of the physical blocks of the rewritable non-volatile memory module and update the mapping information and the variable table corresponding to the plurality of physical blocks according to information recorded in the redundancy bit areas of the physical blocks of the rewritable non-volatile memory module.

14. The memory controller as recited in claim 12, wherein the memory management circuit is further configured to perform the second procedure to load the mapping information and the variable table corresponding to the plurality of physical blocks from the rewritable non-volatile memory module.

15. The memory controller as recited in claim 11, wherein the predetermined condition is satisfied after the state signal is output for a predetermined time period.

16. The memory controller as recited in claim 11, further comprising:
 a first universal input terminal, coupled to a device sleep pin of the host system and configured to receive the first signal;
 a second universal input terminal, coupled to an output terminal of the first circuit and configured to receive the state signal; and
 a universal output terminal, coupled to the power management circuit and configured to output the second signal,
 wherein the predetermined condition is after the universal output terminal is in the first state.

17. A power control method for a memory storage apparatus, wherein the memory storage apparatus has a memory controller, a first circuit, a power management circuit and a rewritable non-volatile memory module, and the rewritable non-volatile memory module has a plurality of physical blocks, the power control method comprising:
 outputting a state signal and keeping the state signal in a first state by the first circuit when the memory storage apparatus is enabled, and transferring the state signal from the first state to a second state and keeping the state signal in the second state by the first circuit after a predetermined condition is satisfied;
 outputting a second signal by the memory controller when receiving a first signal from a host system, wherein the power management circuit stops supplying an output voltage to the memory controller and the rewritable non-volatile memory module when the memory controller outputs the second signal;
 determining whether the state signal is in the first state by the memory controller when the memory storage apparatus is enabled;
 performing a first procedure by the memory controller when the state signal is in the first state; and
 performing a second procedure by the memory controller when the state signal is not in the first state.

18. The power control method as recited in claim 17, further comprising:
 writing user data temporarily stored in a buffer memory into the rewritable non-volatile memory module and storing a mapping information and a variable table corresponding to the plurality of physical blocks in the rewritable non-volatile memory module by the memory controller before outputting the second signal.

19. The power control method as recited in claim 18, wherein the step of performing the first procedure comprises:

scanning redundancy bit areas of the physical blocks of the rewritable non-volatile memory module; and updating the mapping information and the variable table corresponding to the plurality of physical blocks according to information recorded in the redundancy bit areas of the physical blocks of the rewritable non-volatile memory.

20. The power control method as recited in claim 18, wherein the step of performing the second procedure comprises:

loading the mapping information and the variable table corresponding to the plurality of physical blocks from the rewritable non-volatile memory module.

21. The power control method as recited in claim 17, further comprising:

identifying that the predetermined condition is satisfied after the state signal is output for a predetermined time period.

22. The power control method as recited in claim 17, wherein the memory controller comprises a first universal input terminal coupled to a device sleep pin of the host system, a second universal input terminal coupled to an output terminal of the first circuit and a universal output terminal coupled to the power management circuit, wherein the first signal is input to the memory controller via the first universal input terminal, the state signal is input to the memory controller via the second universal input terminal, and the second signal is output via the universal output terminal, and wherein the power controller method further comprises identifying that the predetermined condition is satisfied when the first universal output terminal is in the first state.

* * * * *